(12) United States Patent
Tannenbaum

(10) Patent No.: US 11,274,695 B2
(45) Date of Patent: Mar. 15, 2022

(54) EXPANDING, ANCHORING SCREW

(71) Applicant: Adam Benjamin Tannenbaum, Ashdod (IL)

(72) Inventor: Adam Benjamin Tannenbaum, Ashdod (IL)

(73) Assignee: EVE VENTURES LLC, Brooklyn, NY (US)

( * ) Notice: Subject to any disclaimer, the term of this patent is extended or adjusted under 35 U.S.C. 154(b) by 135 days.

(21) Appl. No.: 16/741,869

(22) Filed: Jan. 14, 2020

(65) Prior Publication Data

US 2021/0215189 A1 Jul. 15, 2021

(51) Int. Cl.
*F16B 39/02* (2006.01)
*F16B 19/12* (2006.01)
*F16B 25/00* (2006.01)

(52) U.S. Cl.
CPC ............ *F16B 39/021* (2013.01); *F16B 19/12* (2013.01); *F16B 25/0015* (2013.01)

(58) Field of Classification Search
CPC ........ F16B 19/12; F16B 19/125; F16B 36/02; F16B 39/023; F16B 39/021
USPC ..................................... 411/19–20, 333, 82.3
See application file for complete search history.

(56) References Cited

U.S. PATENT DOCUMENTS

| | | | | |
|---|---|---|---|---|
| 2,378,118 A * | 6/1945 | Widrich | ............... | F16B 19/125 411/20 |
| 2,398,633 A * | 4/1946 | Gazda | ............... | F16B 19/125 411/333 |
| 2,525,736 A | 7/1946 | Taylor | | |
| 3,166,971 A * | 1/1965 | Stoecker | ............... | F16B 19/125 411/20 |
| 3,522,756 A | 8/1970 | Wolff et al. | | |
| 3,613,495 A * | 10/1971 | Podgursky | ............ | B29C 65/601 411/19 |
| 3,942,407 A | 3/1976 | Mortensen | | |
| 4,514,125 A * | 4/1985 | Stol | ............... | F16B 13/143 156/294 |
| 4,601,625 A * | 7/1986 | Ernst | ............... | F16B 37/127 411/387.4 |
| 5,997,230 A * | 12/1999 | Dodd | ............... | F42B 3/006 411/20 |
| 7,001,124 B2 * | 2/2006 | Panasik | ............... | F16B 13/002 411/30 |
| 7,008,157 B2 * | 3/2006 | O'Banion | ............... | F16B 19/12 411/19 |
| 7,266,874 B2 * | 9/2007 | Ernst | ............... | F16B 13/002 29/432 |
| 8,734,497 B2 | 5/2014 | Goel et al. | | |
| 8,920,087 B2 * | 12/2014 | Buder | ............... | E21D 21/0026 411/82.3 |

* cited by examiner

*Primary Examiner* — Flemming Saether

(74) *Attorney, Agent, or Firm* — Robert Brownstein

(57) ABSTRACT

The invention is an expanding, anchoring screw, made of expandable polymer material. The screw shaft is hollow. After inserting screw in a material, by allowing two reagents to mix in the hollow shaft, and a polymerization chemical reaction to occur, the reagents increase in volume exerting pressure against the inner surface of the hollow shaft, expanding the shaft, and applying greater anchoring force against material in which the screw is inserted.

4 Claims, 7 Drawing Sheets

EXPANDING, ANCHORING SCREW

TECHNICAL FIELD

The invention is a screw whose girth expands due to an internal chemical reaction initiated after it is inserted into a material.

BACKGROUND OF INVENTION

There are several prior-art examples of anchoring screws wherein an anchoring fixture is first inserted into a material and then a conventional screw is threaded through the anchoring fixture causing it to expand and creating a firm anchoring relationship with the material into which it has been inserted.

In some cases, the anchoring fixture is made of a flexible polymer with ribbed exterior such that when the screw is threaded into it, the polymer expands in girth creating a strong frictional interface between anchoring fixture and material. In other cases, the anchoring fixture is metallic and is meant to extend beyond the material, such as sheetrock, such that when the screw is threaded into it, the shape is distorted causing a surface significantly larger than the hole through which it extends that is pulled back toward the face of the surface snugly anchoring the fixture in place.

All of these prior-art inventions make use of two components—the anchoring fixture and a screw. First the anchoring fixture must be inserted and then the screw is threaded into the fixture. In essence it is always a two-step process.

BRIEF DESCRIPTION OF INVENTION

The invention herein disclosed is an expanding screw system in which the screw, itself, is both screw and anchoring fixture. As such, it requires only a single-step insertion.

The screw comprises a firm polymer structure with a disk screw head at one end and a tapered pointed tail end. The screw head may also be tapered so as to allow counter-sunk insertions. A cylindrical shaft extends from head end to tail end, and its external surface is threaded. The shaft contains a hollow portion parallel to its length and centered within the shaft. An aperture in the head forms a continuation of that hollow portion.

Once the screw is inserted in a material, and the head is firmly positioned against a face of that material, an internal chemical reaction is initiated wherein reagents expand in volume pushing against the shaft walls. The polymer screw expands in girth due to this internal pressure and the shaft's outer surface now presses more firmly against the material in which it is inserted. Once the chemical reaction is complete, the expanded reagents become solidified creating a firm anchoring of the screw within the material.

The tail end of the shaft may be enclosed or may be slotted such that reagent chemical-reaction expansion causes two or more petal structures to press against the surrounding material. Here, again, once the reaction is complete, the reagents solidify and the petal structures are pressed firmly against the surrounding material.

Because the screw is both screw and anchoring structure, a single insertion step is all that is required. Initiation of the chemical reaction is done by internally puncturing containers containing the separated reagents. This is done by inserting a metallic cylindrical tool into the aperture in the screw head and pushing it parallel to the shaft axis until it punctures both containers allowing the reagents to mix. The tool is then quickly retracted and the chemical reaction begins the reagent expansion process. Expansion begins within minutes of the mixing of the reagents. The tool may be a specially designed device or a thin, sharp object such as a needle or finishing nail.

BRIEF DESCRIPTION OF DRAWINGS

FIG. 10 B shows the insertion of the initialization tool that punctures the two encapsulated reagents.

FIG. 10 C shows the expansion of the tail end screw portion after the initialization tool has been removed and after the chemical reaction has ended.

FIG. 11 B shows the insertion of the initialization tool that punctures the two encapsulated reagents.

FIG. 11 C shows the expansion of the reagents and the spreading of the tail-end pedal structures after the initialization tool has been removed and after the chemical reaction has ended.

DETAILED DESCRIPTION OF INVENTION

Contemporary anchoring screw systems comprise two components—an anchoring subsystem and a screw subsystem. Applying these devices is a two-step process comprising insertion of an anchor portion followed by insertion of a screw.

The invention herein disclosed is an anchoring screw that comprises both anchoring portion and screw. As such, inserting the screw is essentially inserting both screw and anchoring portion.

Figure 1:
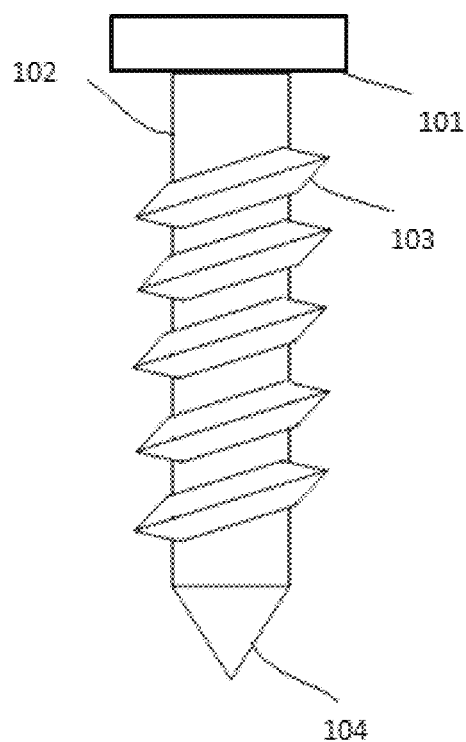
FIG. 1 is an exterior side view of the expanding screw system.

As shown in FIG. 1, one embodiment of the invention comprises a screw head (101), a shaft (102), external threads on the shaft (103) and an enclosed tail end structure (104). The screw head (101) may be a disk, as shown, or may be tapered to allow counter-sunk applications wherein the head is flush with the surface after insertion (not shown). The invention comprises firm polymer material that can expand under pressure.

Figure 2:
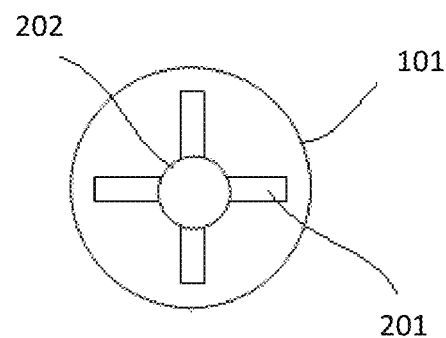
FIG. 2 is a top view of the system from FIG. 1 showing the top of the screw head.

FIG. 2 shows a top view of the screw head (101) showing a Phillips screw indentation pattern (201) and an aperture (202) that is the opening of a hollow portion of the screw shaft.

Figure 3:
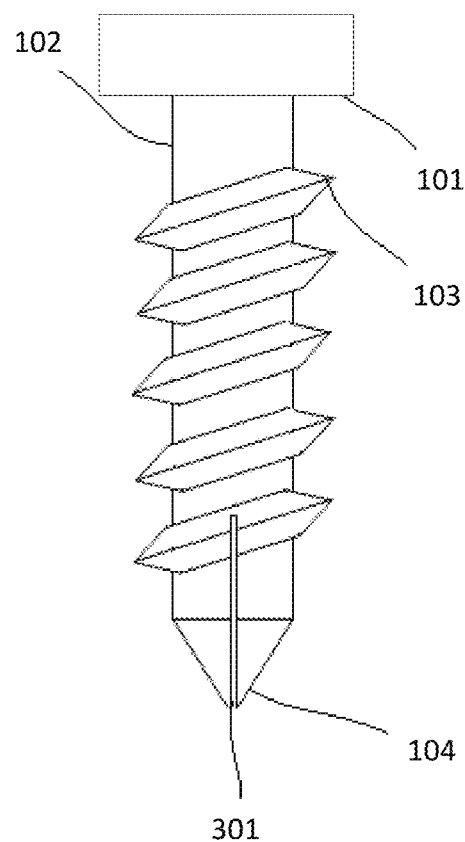
FIG. 3 is an exterior side view of another embodiment wherein the tail end is slotted.

FIG. 3 shows another embodiment of the invention wherein the same head (101), shaft (102), and thread (103) structures are used as in the embodiment of FIG. 1 but the tail end portion (104) is slit (301) to allow the tip to separate into a pair of pedal structures when subject to internal pressure.

Figure 4:
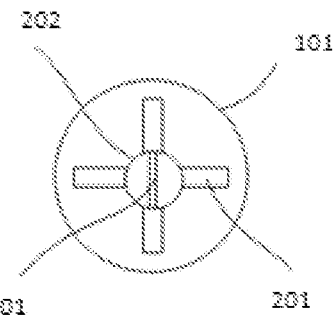
FIG. 4 is a top view of the system from FIG. 3 showing the top of the screw head.

FIG. 4 is a top view of the embodiment of FIG. 3 showing the head (101), shaft (202), Phillips screw indentation (201) and the slit (301) at the tail end.

Figure 5:
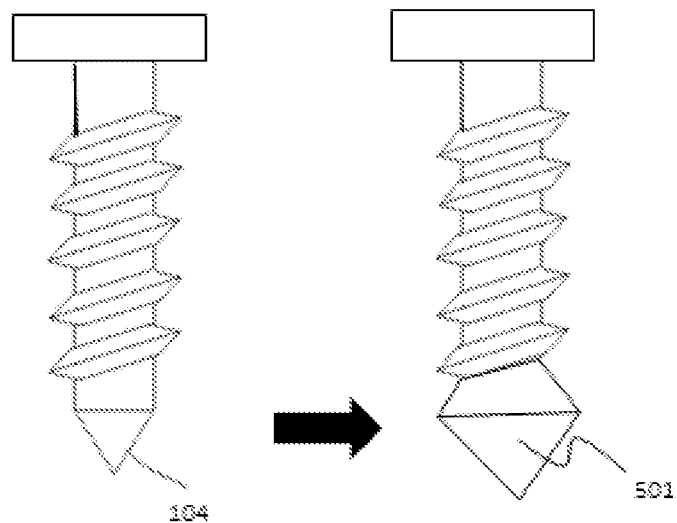
FIG. 5 illustrates the expansion of the tail end of the screw system of FIG. 1.

FIG. 5 shows the screw system of FIG. 1 before and after a buildup of positive internal pressure. Before, the tail end (104) as shown in FIG. 1; however, after positive internal pressure occurs, the tail end portion has expanded (501). Note that the entire shaft may also be expanded, not just the tail end (not shown).

Figure 6:
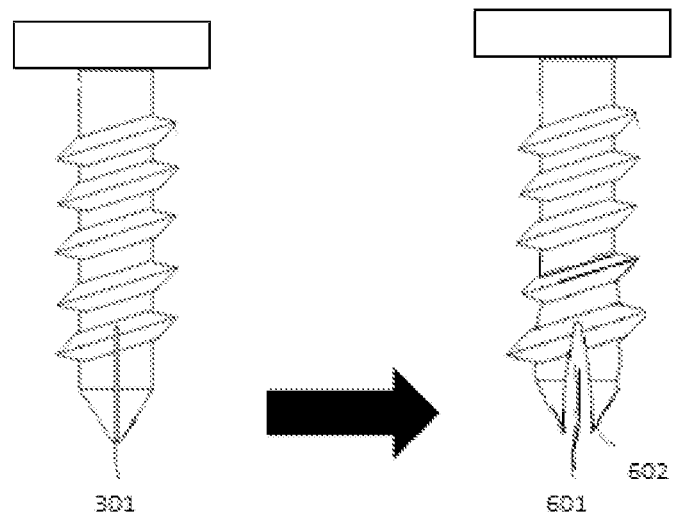
FIG. 6 illustrate the expansion and separation of pedal structures in the tail end of the system of FIG. 3.

FIG. 6 shows the screw system of FIG. 3 before and after buildup of positive internal pressure. Before, the tail end (301) is the same as in FIG. 3. After the positive internal pressure occurs, the slit widens (601) and pedal structures (602) are formed which expand so as to increase the girth of the shaft's tail end.

Figure 7:
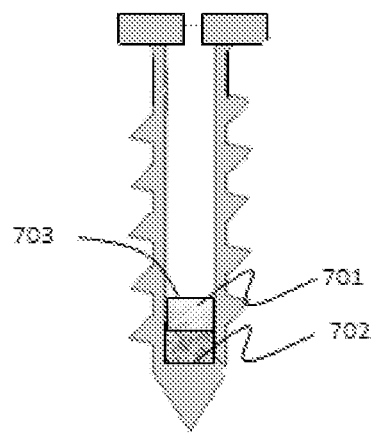
FIG. 7 is a cutaway view of the system of FIG. 1 showing the juxtaposition of two encapsulated reagents inside the shaft.

FIG. 7 is a cutaway view of the screw system of FIG. 1 showing the hollow portion of the shaft with two encapsulated reagents (701 and 702) that are isolated from one another by the encapsulation (703). Note that encapsulated reagents may occupy the entire share and not just the tip (not shown).

Figure 8:
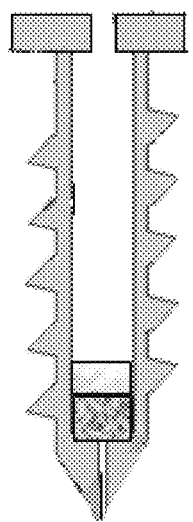
FIG. 8 is a cutaway view of the system of FIG. 3 showing the juxtaposition of two encapsulated reagents inside the shaft.

FIG. 8 is a cutaway view of the screw system of FIG. 3 showing the hollow portion of the shaft with the two encapsulated reagents as in FIG. 7.

Figure 9:
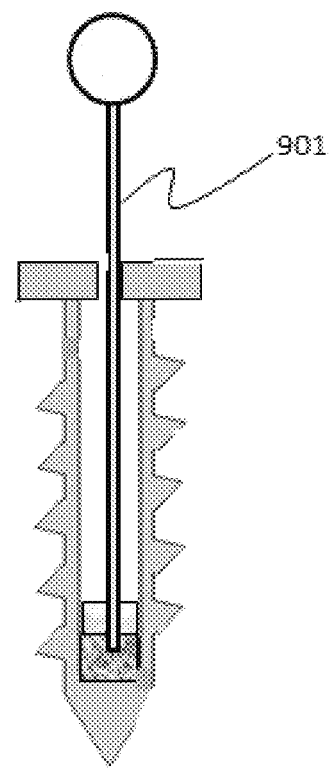
FIG. 9 illustrates the insertion of an initialization tool through the screw head aperture and puncturing the two encapsulated reagents.

In FIG. 9, an initiator tool (901) comprising a cylindrical metal shaft that is smaller in diameter and longer than the hollow portion of the shaft, and has a handle at one end, is inserted through the screw-head aperture, down through the hollow portion of the shaft and through both encapsulated reagents essentially puncturing the isolating encapsulation and allow the two reagents to mix together. This tool may be a specially designed tool or a device such as a needle or finishing screw wherein its length exceeds that of the shaft and its width is narrower than that of the shaft's hollow space.

Figure 10:
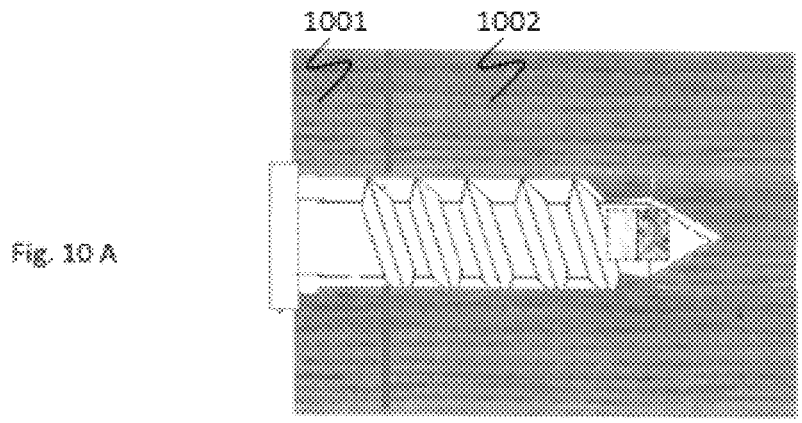
FIG. 10 A shows the screw system of FIG. 1 used to attach two wood portions together.
Figure 10:
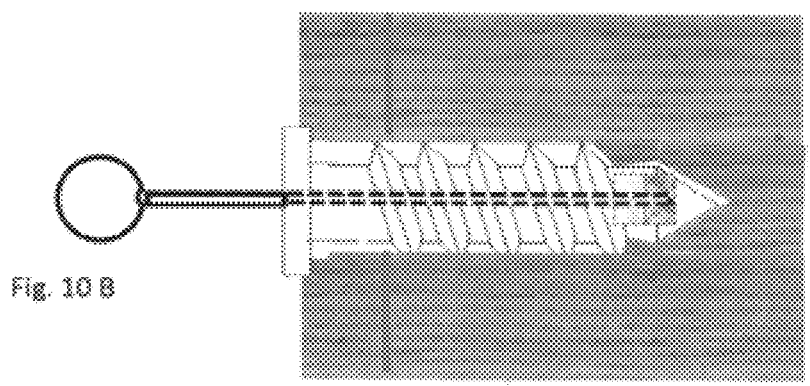
Figure 10:
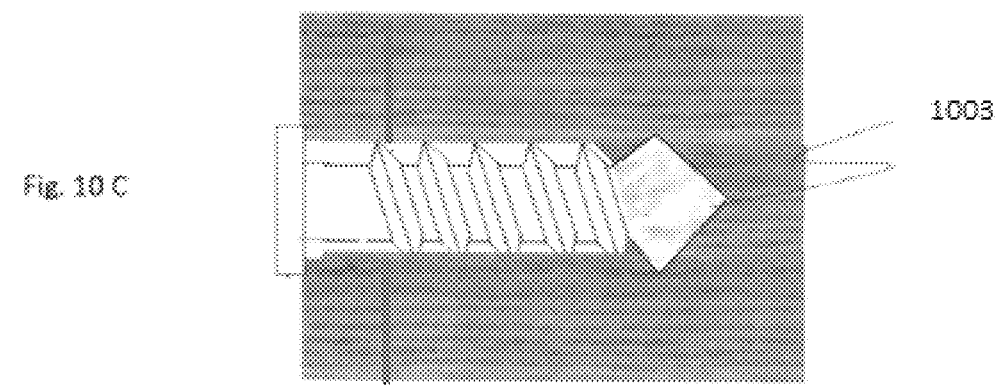

As applied, as shown in FIG. 10 A, the screw system from FIG. 1 is inserted into two portions of wood material (1001 and 1002) so as to join them firmly to one another. In FIG. 10 B, an initiator tool is inserted through the screw-head aperture and pushed through the shaft so as to puncture both encapsulated reagents, allowing them to mix. The tool is then extracted (not shown) and after the chemical reaction has ended, FIG. 10 C, the tail end portion has expanded (1003) due to internal pressure from the increased volume of chemical-reaction result. The expanded tail-end portion (1003) thus exerts more pressure on the surrounding material, anchoring the screw and firmly joining the two wooden portions. Note that reagents may occupy the entire shaft, and the whole shaft may be expanded due to internal pressure (not shown).

Figure 11:
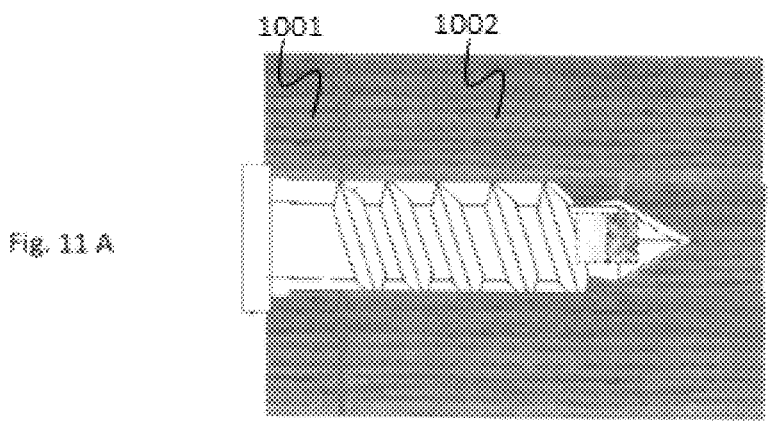
FIG. 11 A shows the screw system of FIG. 3 used to attach two wood portions together.
Figure 11:
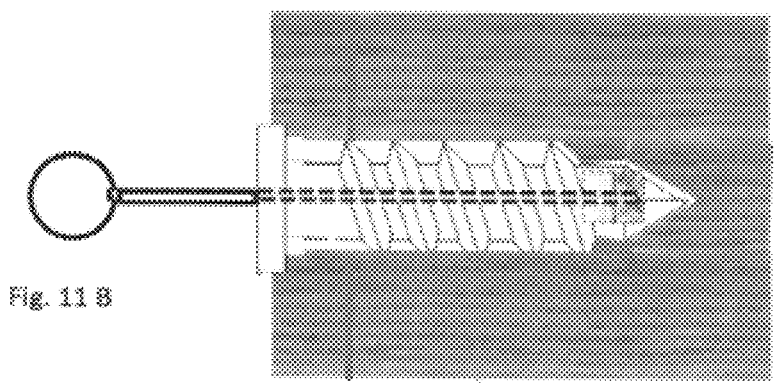
Figure 11:
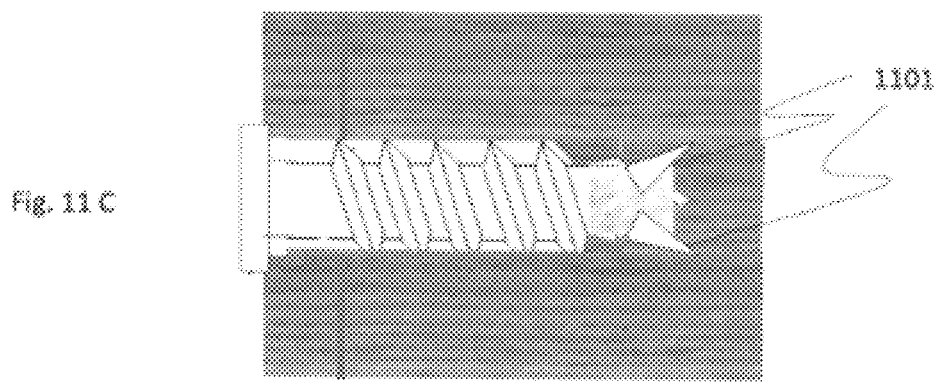

As applied, as shown in FIG. 11 A, the screw system from FIG. 3 is inserted into two portions of wood material so as to join them firmly to one another. In FIG. 11 B, an initiator tool is inserted through the screw-head aperture and pushed through the shaft so as to puncture both encapsulated reagents, allowing them mix. The tool is then retracted (not shown) and after the chemical reaction has ended, FIG. 11 C, the slotted tail-end portion (1101) has expanded such that the slit widens and pedal structures protrude outward increasing the pressure on the surrounding material, anchoring the screw and firmly joining the two wooden portions.

The embodiments as described are exemplary. They show both reagents present inside the expanding screw prior to insertion. Only one reagent might be contained within the screw and the second reagent could be added by an initiator tool with a hollow shaft and a reagent reservoir in its handle. In another embodiment, the screw may contain no reagents and both reagents are injected through the aperture using an initiator tool having two parallel shafts and separate reagent reservoirs in its handle. If used in a soft material, such as dry wall, the screw may be screwed into the material prior to chemical reaction and expansion. If used in a harder material, the screw is inserted into an existing channel wherein the screw slips snugly into the channel, prior to chemical reaction and expansion. Once expanded, the shaft threads press firmly against the material making for a tight, secure fit.

The chemical reaction causing the increased volume and internal pressure may be a polymerization process. One reagent could be a resin, such as isocyanate; and the other reagent could be a catalyzing agent such as polypol. Virtually any binary material combination that upon mixing causes a polymerization process to occur could be used to trigger the expansion result.

The screw systems shown in the drawing are exemplary. Screw heads could be disk or tapered. The head indentations could be a Phillips configuration, a single slotted one, hex-key format, and the like.

What is claimed is:

1. An expanding screw system comprising:
a screw head disk portion;
a cylindrical threaded shaft portion;
a tail-end portion;
said cylindrical threaded-shaft portion has an internal cylindrical coaxial hollow portion;
said screw head disk portion has an aperture centered and perpendicular to said disk portion and concentric with said internal cylindrical coaxial hollow portion;
all portions comprise expandable polymer material;
said internal cylindrical coaxial hollow portion has an encapsulated first reagent;
said internal cylindrical coaxial hollow portion has an encapsulated second reagent; and
said encapsulated second reagent located adjacent to said first reagent.

2. A system as in claim 1 further comprising:
an initiator tool comprising a metal cylindrical shaft that is pointed at one end;
said metal cylindrical shaft diameter allows it to extend through said screw head disk portion aperture and said internal cylindrical coaxial hollow portion; and
said initiator tool operative to extend into said internal cylindrical coaxial hollow portion so as to puncture encapsulating containers of said encapsulated first reagent and said encapsulated second reagent enabling un-encapsulated first reagent to mix with un-encapsulated second reagent.

3. A system as in claim 1 further comprising:
said tail-end portion is solid and tapered.

4. A system as in claim 1 further comprising:
said tail-end portion is tapered and slit parallel to axis of said cylindrical threaded shaft portion.

* * * * *